(12) United States Patent
Peng et al.

(10) Patent No.: US 9,946,016 B2
(45) Date of Patent: *Apr. 17, 2018

(54) WAVEGUIDE WITH SHAPED ASSISTANT LAYER

(71) Applicant: Seagate Technology LLC, Cupertino, CA (US)

(72) Inventors: Chubing Peng, Eden Prairie, MN (US); Pierre Asselin, Richfield, MN (US); Lien Lee, Maple Grove, MN (US); Karen V. Rud, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,117

(22) Filed: Sep. 23, 2015

(65) Prior Publication Data

US 2017/0084299 A1    Mar. 23, 2017

(51) Int. Cl.
| | |
|---|---|
| *G02B 6/12* | (2006.01) |
| *G02B 6/122* | (2006.01) |
| *G11B 5/60* | (2006.01) |
| G11B 5/00 | (2006.01) |
| G11B 5/31 | (2006.01) |

(52) U.S. Cl.
CPC ....... *G02B 6/12002* (2013.01); *G02B 6/1228* (2013.01); *G11B 5/6088* (2013.01); *G02B 2006/12092* (2013.01); *G02B 2006/12147* (2013.01); *G11B 5/314* (2013.01); *G11B 2005/0021* (2013.01)

(58) Field of Classification Search
CPC  G11B 5/4866; G02B 6/12002; G02B 6/1228; G02B 2006/12092; G02B 2006/12147; G02B 2005/0021

USPC ...................... 385/14, 129; 369/13.01–13.55
See application file for complete search history.

(56) References Cited

U.S. PATENT DOCUMENTS

| | | | |
|---|---|---|---|
| 6,052,397 A | 4/2000 | Jeon et al. | |
| 6,253,009 B1 | 6/2001 | Lestra et al. | |
| 7,184,643 B2* | 2/2007 | Blauvelt | G02B 6/1228 385/129 |
| 8,295,010 B2 | 10/2012 | Shimazawa et al. | |
| 8,385,183 B2* | 2/2013 | Peng | G11B 5/314 369/112.27 |
| 8,588,039 B1* | 11/2013 | Shi | G11B 5/314 369/13.13 |

(Continued)

OTHER PUBLICATIONS

File History for U.S. Appl. No. 14/863,096 as retrieved from the U.S. Patent and Trademark Office, 82 pages.

*Primary Examiner* — Ryan Lepisto
*Assistant Examiner* — Guy Anderson
(74) *Attorney, Agent, or Firm* — Hollingsworth Davis, LLC

(57) ABSTRACT

An apparatus includes a waveguide extending along a light-propagation direction between a light source and a media-facing surface. The waveguide comprises an assistant layer configured to receive light from a light source, truncated with an intermediate bottom cladding layer. A core layer comprises a coupling end configured to receive light from the assistant layer. The coupling end comprises a taper that widens toward the media-facing surface. A near field transducer is disposed proximate the media-facing surface and is configured to receive the light from the core layer.

20 Claims, 11 Drawing Sheets

(56) References Cited

U.S. PATENT DOCUMENTS

| | | | | |
|---|---|---|---|---|
| 8,644,124 B2* | 2/2014 | Huang | ............... | G02B 6/036 369/112.27 |
| 8,873,349 B2* | 10/2014 | Peng | ............... | G02B 6/0065 369/13.13 |
| 9,405,066 B2* | 8/2016 | Mahgerefteh | ......... | G02B 6/124 |
| 2008/0204916 A1* | 8/2008 | Matsumoto | ........... | G11B 5/314 360/59 |
| 2013/0279313 A1 | 10/2013 | Huang et al. | | |
| 2014/0140659 A1* | 5/2014 | Demaray | ............. | G02B 6/132 385/28 |
| 2015/0121685 A1* | 5/2015 | Clinton | ............. | G11B 5/3166 29/593 |
| 2015/0179197 A1* | 6/2015 | Clinton | ............. | G11B 5/4866 369/13.33 |
| 2017/0052317 A1* | 2/2017 | Mahgerefteh | ........ | G02B 6/1228 |

\* cited by examiner

WAVEGUIDE WITH SHAPED ASSISTANT LAYER

SUMMARY

The present disclosure is related to a waveguide extending along a light-propagation direction between a light source and a media-facing surface. The waveguide comprises an assistant layer configured to receive light from a light source, truncated with an intermediate bottom cladding layer. A core layer comprises a coupling end configured to receive light from the assistant layer. The coupling end comprises a taper that widens toward the media-facing surface. A near field transducer is disposed proximate the media-facing surface and is configured to receive the light from the core layer.

According to various embodiments, a waveguide extends along a light propagation direction between a light source and a media-facing surface. The waveguide comprises an assistant layer configured to receive light from a light source. The assistant layer comprises an out-of-plane step and a terminating end with a first taper that narrows toward the media-facing surface. A core layer comprises a coupling end configured to receive light from the assistant layer. The coupling end comprises a second taper having a first width proximate the light source and a second width away from the light source, the second width being greater than the first width. A near field transducer disposed proximate the media-facing surface and configured to receive the light from the core layer.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure generally relates to writing data with a heat assisted magnetic recording (HAMR) device. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

In some configurations, a HAMR write head has a waveguide that delivers light from an energy source (e.g., a laser diode) to a near-field transducer (NFT), also referred to as a near-field antenna, plasmonic transducer/antenna, etc. The light generates a surface plasmon field on the NFT, and the surface plasmons are directed out of a surface of the write head onto a magnetic recording medium. This creates a hotspot on the recording medium during writing. Optimal coupling is achieved by matching the mode profile between the laser diode and the waveguide on slider.

Figure 1:
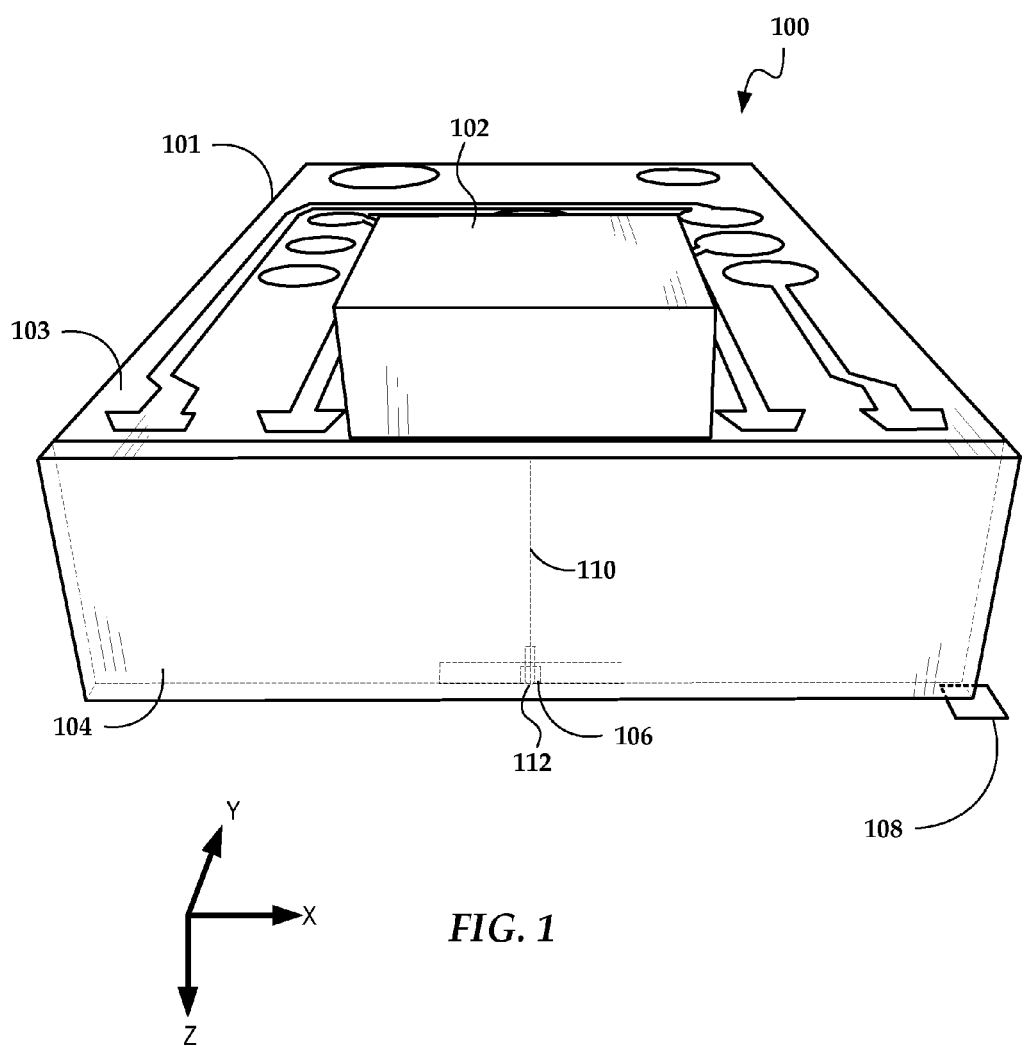
FIG. 1 is a perspective view of a slider assembly according various embodiments described herein.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, rhodium, platinum, iridium, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative z-direction in this view).

While the example in FIG. 1 shows a laser diode 102 directly mounted to the slider body 101, the waveguide system 110 discussed herein may be applicable to any type of light delivery configuration. For example, a submount (not shown) may be used between a laser diode and the slider body 101. In such a case, the submount orients the laser diode so that an active region of the laser diode is oriented in a vertical direction (z-direction in this view) and is aligned with the waveguide system 110.

Figure 2A:
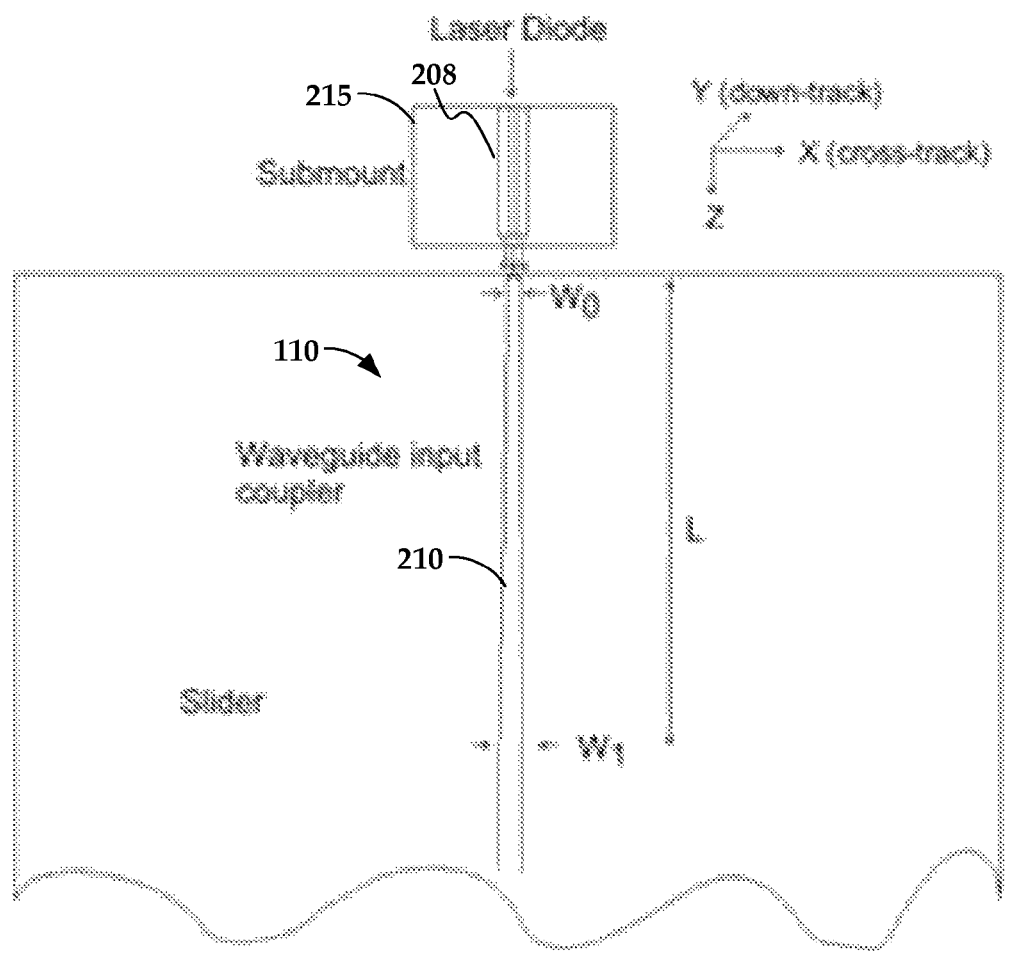
FIGS. 2A-2C illustrate cross-sectional portions of the slider body according to some embodiments.
Figure 2B:
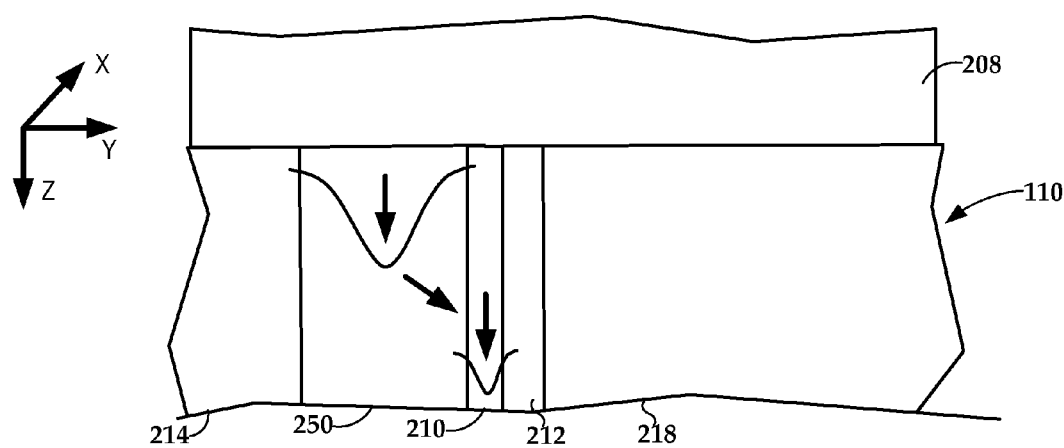
Figure 2C:
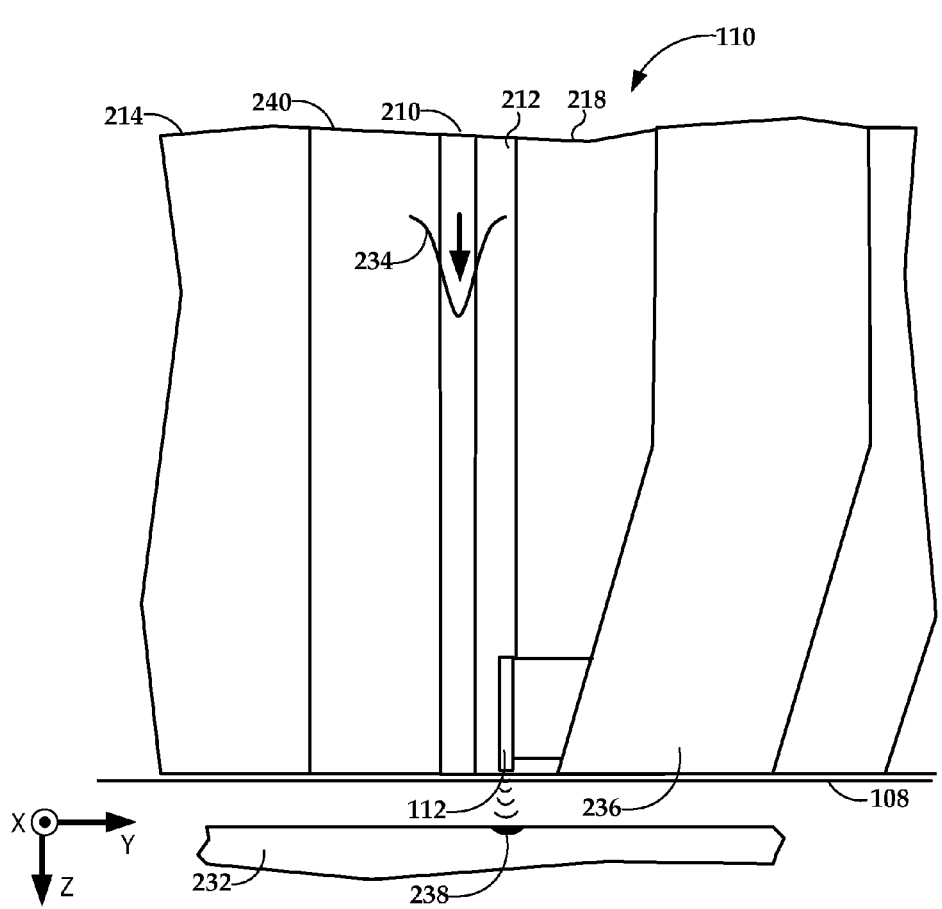

FIGS. 2A-2C illustrate cross-sectional portions of the slider body 101 according to various embodiments. The diagram in FIG. 2A shows a portion of the slider body proximate a light/energy source 208 (e.g., an edge-emitting laser diode). In this example, the light/energy source is mounted on a submount 215. A core 210 of waveguide 110 extends along the light propagation direction (z-direction) where it is directly or indirectly coupled to a light/energy source 208 at a first end of the waveguide core. The waveguide core 210 has a tapered input coupler region having a first width $W_0$ proximate the light source 208. The input coupler region flares to a second width $W_1$ as it extends away from the light source 208.

As seen in FIG. 2B, an assistant layer 250 is positioned proximate the waveguide core 210 to couple light from the light source 208 into the core 210 at or near the region where the core 210 tapers from narrower width ($W_0$) to wider width ($W_1$). According to various implementations $W_0$ is between about 50 nm and 280 nm or between about 120 nm to about 240 nm. In some cases, $W_1$ is chosen such that the waveguide mode is confined to the core as a single mode waveguide. The length of the taper may be about 50-150 µm. The assistant layer 250 (thickness along y direction and index of refraction) may be optimized to match the mode size of the light source 208 along y direction and the core width $W_0$ adjacent to the light source 208 is chosen to match the mode size of the light source 208 along x direction.

As previously described, the core width (along cross-track direction, i.e., the X direction) increases as the distance away from the light source 208 increases ($W_1 > W_0$). Light exiting from the light source 208 is first coupled into the assistant layer 250 and is transferred into the waveguide core 210 slowly. The waveguide system 110 includes side cladding layers 212, bottom cladding layer 214, and top cladding layer 218 that surround the waveguide core 210 and the assistant layer 250.

As shown in FIG. 2C, the assistant layer 250 may be truncated with intermediate bottom cladding 240 after the light is coupled into the waveguide core 210. This may improve the excitation efficiency of the near-field transducer 112 if the refractive index of intermediate bottom cladding 240 is lower than that of side cladding layers 212. The intermediate bottom cladding 240 may have a lower index of refraction than the assistant layer 250 to push the waveguide mode into the side cladding layer 212, where a near-field transducer 112 resides. This increases the field to excite the near field transducer 112. The assistant layer 250 has an index of refraction greater than cladding layers 212, 214, 218 According to various implementations, silica ($SiO_2$) is used for the intermediate bottom cladding layer 240. In some cases, the intermediate bottom cladding layer 240 might also uses the same material as the other cladding layers 212, 214, 218. In some cases, the top cladding layer 218 is $SiO_2$, and has an index refraction of 1.46. The bottom cladding layer 214 may use $Al_2O_3$ having an index of refraction of 1.65. According to various implementations, side cladding layers 212 use $Al_2O_3$. Side cladding layers may use atomic layer deposition, having an index of refraction of 1.63. The assistant layer may 250 may include SiONx and have an index of refraction of 1.70. Materials with index below SiO2 include magnesium fluoride ($MgF_2$, n=1.38) and porous $SiO_2$.

According to various implementations, the waveguide core 210 is made of dielectric materials of high index of refraction, for instance, $Ta_2O_5$, $HfO_2$, $TiO_2$, $Nb_2O_5$, $Si_3N_4$, SiC, $Y_2O_3$, ZnSe, ZnS, ZnTe, $Ba_4Ti_3O_{12}$, GaP, $CuO_2$, and Si. The assistant layer 250 may be formed of a dielectric material having an index of refraction slightly higher than that of the cladding layers 214, 212, and 218 but much lower than that of the core, for instance, SiOxNy, AlN, and alloys $SiO_2$—$Ta_2O_5$, $SiO_2$—ZnS, $SiO_2$—$TiO_2$. The cladding layers 212, 214, 218, 240 are each formed of a dielectric material having a refractive index lower than the waveguide core 210 and the assistant layer 250, be made of a material, for instance, $Al_2O_3$, SiO, and $SiO_2$. The cladding layers 212, 214, 218, 240 may be formed of the same material. In some cases, the cladding layers 212, 214, 218, 240 are formed of different materials. Generally, the dielectric materials are selected so that the refractive index of the core layer 210 is higher than refractive indices of the cladding layers 212, 214, 218, 240. This arrangement of materials facilitates efficient propagation of light through the waveguide system.

In FIG. 2C, the near-field transducer 112 is shown proximate to a surface of magnetic recording medium 232, e.g., a magnetic disk. The waveguide system 110 delivers electromagnetic energy 234 to the near-field transducer 112, which directs the energy 234 to create a small hot spot 238 on the recording medium 232. A magnetic write pole 236 causes changes in magnetic flux near the media-facing surface 108 in response to an applied current. Flux from the write pole 236 changes a magnetic orientation of the hot spot 238 as it moves past the write pole 236 in the down track direction (y-direction).

In some embodiments, the energy 234 propagating in the waveguide core 210 is at a fundamental transverse electric ($TE_{00}$) mode or a fundamental transverse magnetic ($TM_{00}$) mode. In some implementations, there may be a mode mismatch between the light source and the waveguide. Efficient coupling from light source to waveguide may be preferred to reduce energy consumption for recording, and also to mitigate heating that occurs from stray light, for instance, light induced writer protrusion. The coupling efficiency is determined by the mode overlap between the light source and the waveguide. For a typical edge-emitting laser diode, the output beam size in $1/e^2$ intensity full width is about 1.2 µm along its fast axis direction and 5.2 µm along its slow axis direction. For a waveguide used in heat-assisted magnetic recording, the fundamental mode size is about 0.25 µm normal to waveguide plane and smaller than 0.50 µm parallel to the waveguide plane.

According to various implementations, the light source is a TE (transverse electric) polarized edge-emitting laser diode, orientated such that its fast-axis normal to (along y direction) and slow-axis is parallel to (along x direction) the waveguide plane. The waveguide system 110 may include a multiplexer that converts the energy 234 to a combined polarization mode. The combined mode includes a fundamental transverse $TM_{00}$ mode and a first higher-order transverse electric, $TE_{10}$. The near-field transducer 112 is excited by the combined mode, and in response, tunnels direct plasmons to the recording medium 232.

As described above, the assistant layer may be truncated with an intermediate bottom cladding layer. In accordance with various implementations, the intermediate bottom cladding layer is a different material than the assistant layer. The different materials at the boundary of the assistant layer and the intermediate bottom cladding layer may cause a mode mismatch at the boundary between the intermediate bottom cladding layer and the assistant layer. The assistant layer material is used to match the mode of the light source and, while the material that is chosen for the intermediate bottom cladding layer is used to increase NFT efficiency. Various techniques can be used to improve the mode mismatch between the different materials.

Figure 3:
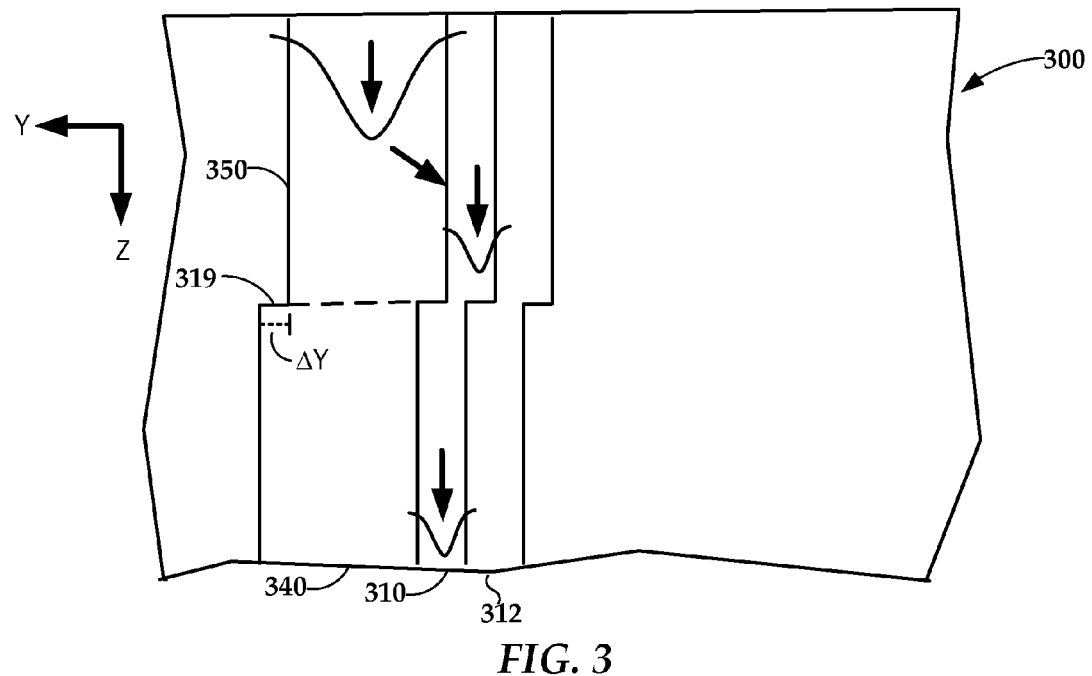
FIG. 3 illustrates cross sectional views of the slider body according to various embodiments.
Figure 4:
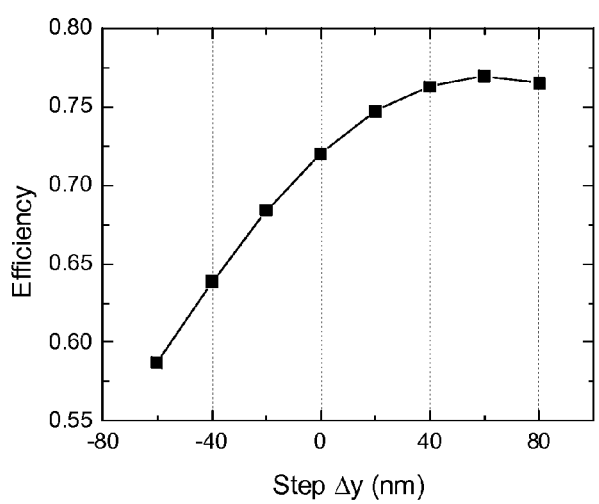
FIG. 4 is a graph showing the efficiency for an out-of-plane step versus the width of the step.

In accordance with various embodiments described herein, the assistant layer is shaped in an effort to improve the mode mismatch between cladding layers. FIG. 3 shows a waveguide system 300 having a shaped assistant layer 350. Since the refractive index of the assistant layer is greater than the refractive index of the intermediate bottom cladding layer 340, the mode field may extend into the assistant layer 350 more than that into the intermediate bottom cladding layer 340, resulting in mode mismatch and radiation loss. According to various implementations, the assistant layer includes an out-of-plane step to improve the mode mismatch. In FIG. 3, the assistant layer 350 is positioned proximate the waveguide core 310 and includes an out-of-plane step 319. The step 319 may be positioned at the interface between the assistant layer 350 and the intermediate bottom cladding layer 340. In some cases, the waveguide core 310 and the side cladding layers 312 also include a step as shown in FIG. 3. By fabricating a step, having a width, Δy, the mode mismatch is improved and light delivery efficiency goes up. Since the mode does not fully match at the interface, even with an optimal step size Δy, there may be radiation loss across the interface. FIG. 4 shows the efficiency for an out-of-plane step in response to the width of the step. The out-of-plane step increases the efficiency from 0.72 at Δy=0 to 0.77 at a Δy of about 60 nm. According to various embodiments, Δy is between 10-100 nm or between 40 and 80 nm.

Figure 5A:
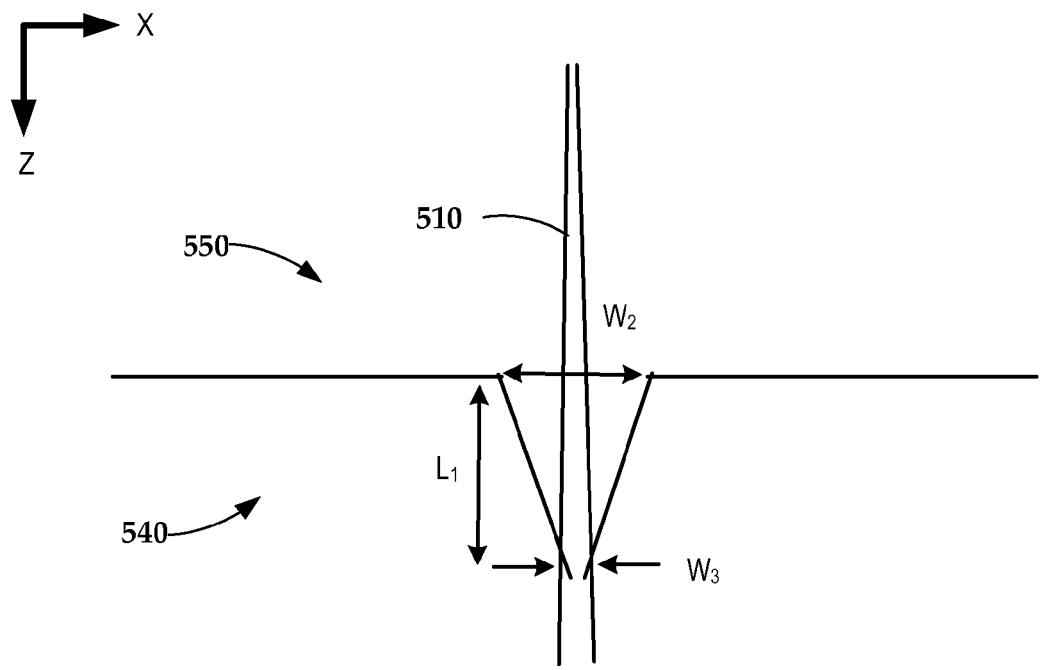
FIGS. 5A-5D are cross-sectional views of the slider body having a tapered assistant layer according to various embodiments described herein.
Figure 5B:
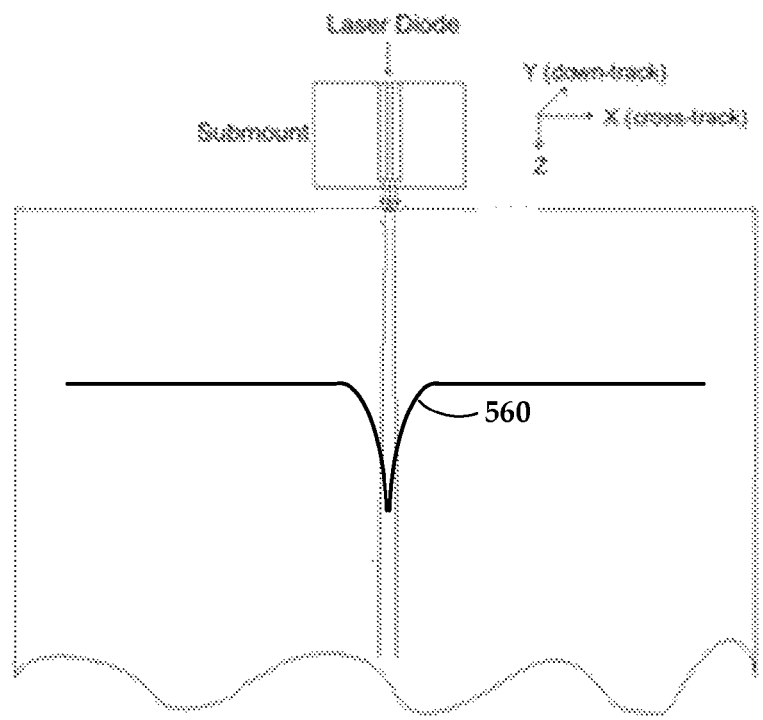
Figure 5C:
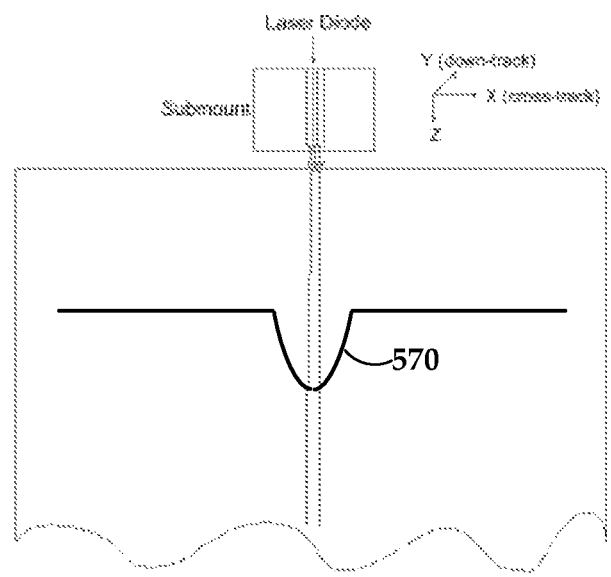
Figure 5D:
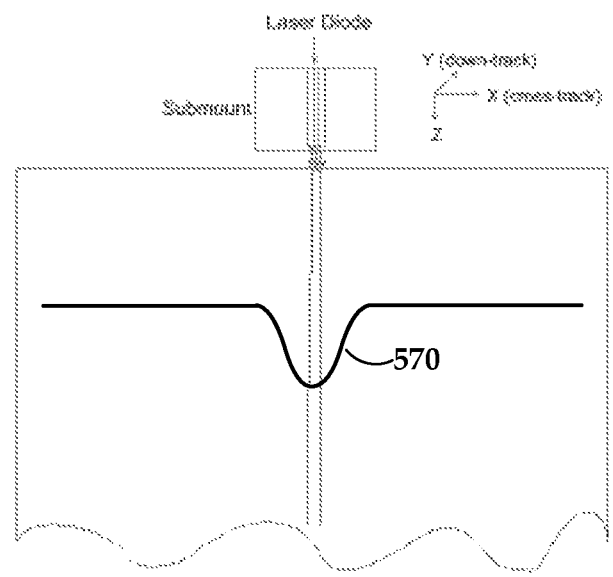

According to various implementations, the assistant layer has a taper that narrows towards the media facing surface as shown in FIGS. 5A-5D. FIG. 5A illustrates an apparatus according to various embodiments that includes an assistant layer having an in-plane taper in accordance with various embodiments. The tapering in the assistant layer starts from $W_2$ and ends at $W_3$ over length $L_1$. According to various embodiments, the taper starts after the input coupler or near the end of input coupler. As seen in FIG. 5A, a taper starts after the input coupler region of the waveguide core 510 or near the end of input coupler region 510. The tapering in the assistant layer 550 starts from a first width ($W_2$) and terminates at a second width ($W_3$) over length $L_1$. According to various embodiments, the taper starts after the input coupler or near the end of input coupler. $W_2$ may be chosen to be wider than the mode field along X direction, e.g., 3-5 μm. $W_3$ may be chosen to be as small as possible, for example, <200 nm to achieve adiabatic mode transformation from assistant layer 550 material to the intermediate bottom cladding layer 540 material. The range of $W_2$ is between 5 and 6 μm in some embodiments, and may be reached by current photo-lithography using 193 nm UV light with resolution ~100 nm, for example. The taper length $L_1$ may be chosen to minimize mode transmission loss between the assistant layer and the waveguide core. The length of the taper may be chosen to be as short as possible to minimize waveguide sidewall roughness-induced radiation. FIG. 5A illustrates a linear taper. In other implementations, taper is not linear as shown in FIGS. 5B, 5C, and 5D for assistant layers 560, 570, and 580.

Figure 6A:
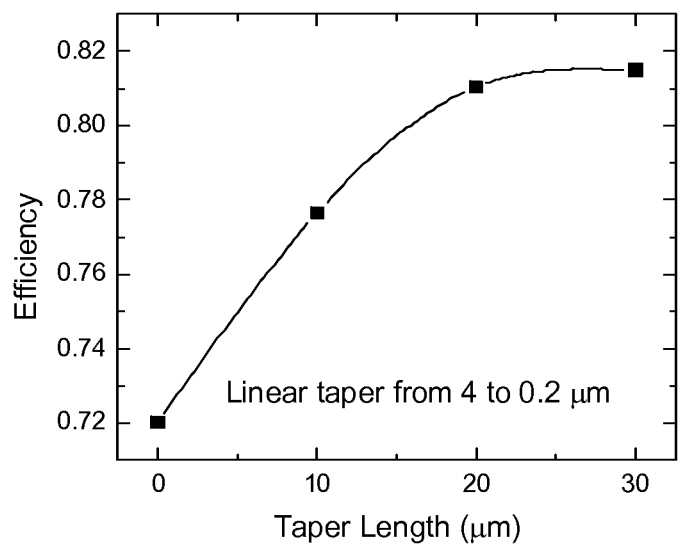
FIGS. 6A-6C are graphs illustrating efficiency when using various configurations of an in-plane taper according to various embodiments.
Figure 6B:
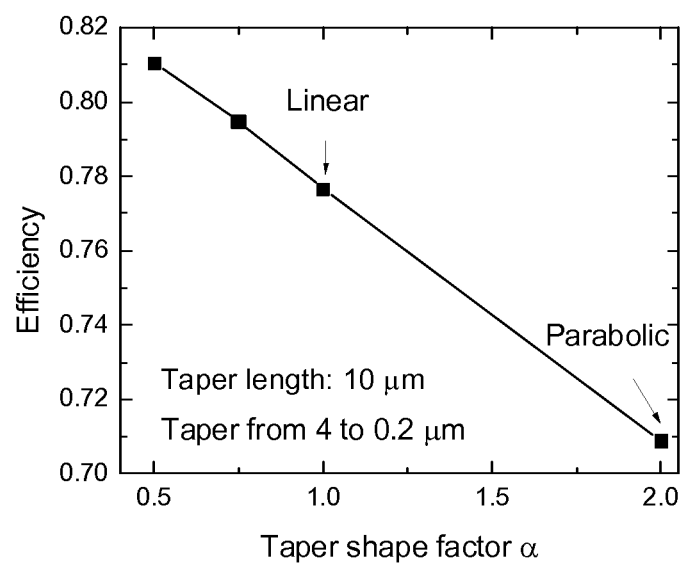
Figure 6C:
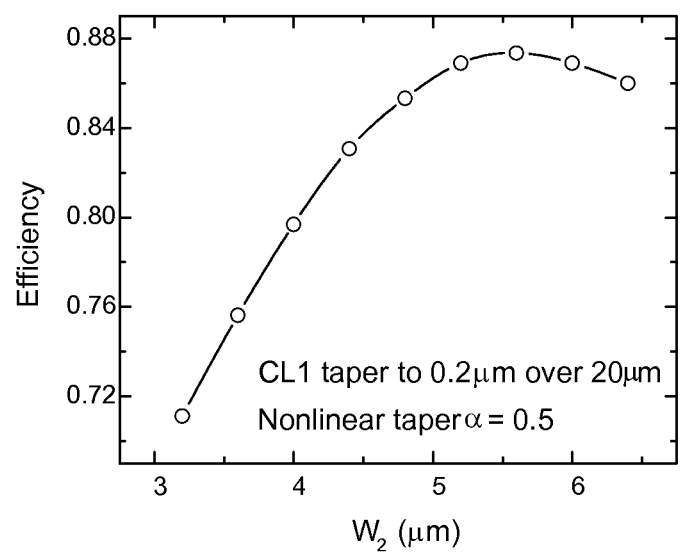

FIGS. 6A-6B illustrate the efficiency when using an in-plane taper. FIG. 6A shows the efficiency using a linear taper versus the length of the taper. As shown, the efficiency reaches the highest using a linear taper having a length greater than 25 μm. According to various embodiments, when using a short taper length, e.g., $L_1$=10 μm, a nonlinear taper can speed up the transition and reach lossless transition. FIG. 6B shows the efficiency using various taper shapes. A taper with α=1 is linear and α=2 is parabolic. The nonlinear taper may have the form:

$$z = L_1 \frac{w_2^\alpha - w^\alpha}{w_2^\alpha - w_3^\alpha},$$

where, z denotes the distance from the top of the taper, $W_2$ is the top width and $W_3$ is the bottom width, $L_1$ is the taper length, and α is the shape factor. Other taper configurations may be used, for example, a cosine shape taper as shown in FIGS. 5A-5D. The efficiency was highest at a taper shape factor of about 0.5. FIG. 6C shows the efficiency of a nonlinear taper, with α=0.5, versus the top width, $W_2$. In some cases, the efficiency is highest with a taper having a top width between about 5 and 6 μm, e.g., 5.6 μm.

Figure 7:
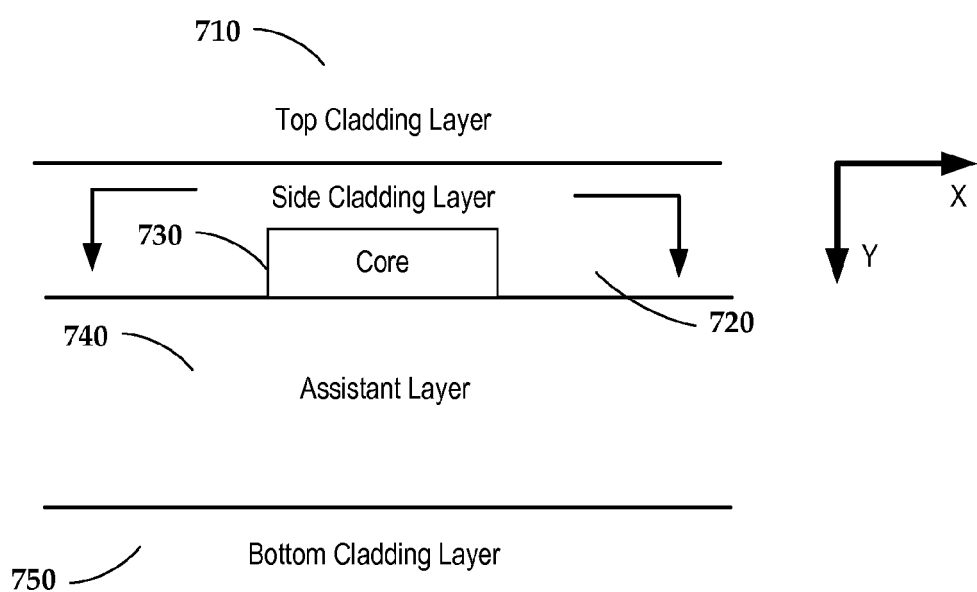
FIG. 7 is a cross-sectional view of a slider body according to various embodiments.

FIG. 7 illustrates a cross-sectional view of a slider body according to various embodiments. As seen in FIG. 7, an assistant layer 740 couples light from the light source into the waveguide core 730. The waveguide core 730 is surrounded by a side cladding layer 720, a top cladding layer 710, the assistant layer 740, and a bottom cladding layer 750. According to various implementations, the waveguide core 730 comprises $TiO_2$ and is about 120 nm thick with an index of refraction of 2.36. In some cases, the waveguide core comprises $Ta_2O_5$ and has a thickness of 0.14 μm and an index of refraction of 2.065. The waveguide core 730 and the assistant layer 740 may be surrounded by other cladding layers 710, 720, 750 having a lower index of refraction than the waveguide core 730. For either configuration, the top cladding may be formed of $SiO_2$ having an index of refraction of 1.46. The side cladding may use $Al_2O_3$ with a thickness of 240 nm and an index of refraction of 1.63. The bottom cladding for either configuration may also use $Al_2O_3$ and have an index of refraction of 1.65. In some cases, the bottom cladding layer comprises $Al_2O_5$. The side cladding layers 720 may be 220 nm thick, for example. According to various implementations, the thickness of the assistant layer 740 ($t_a$) is 0.7 μm. the index of refraction of the assistant layer 740 may be 1.70. The light source is a TE (transverse electric) polarized edge-emitting laser diode, orientated such that its fast-axis normal to (along y direction) and slow-axis parallel to (along x direction) the waveguide plane. The output beam size in $1/e^2$ intensity full width is about 1.2 μm along its fast axis direction and 5.2 μm along its slow axis direction. Modeling with a beam-propagation-method shows that the optimal assistant layer is about 0.7 μm thick and its index of refraction n=1.70. The $Ta_2O_5$ core tapes linearly from $W_0$=0.16 μm to $W_1$=0.6 μm over 100 μm long.

Figure 8:
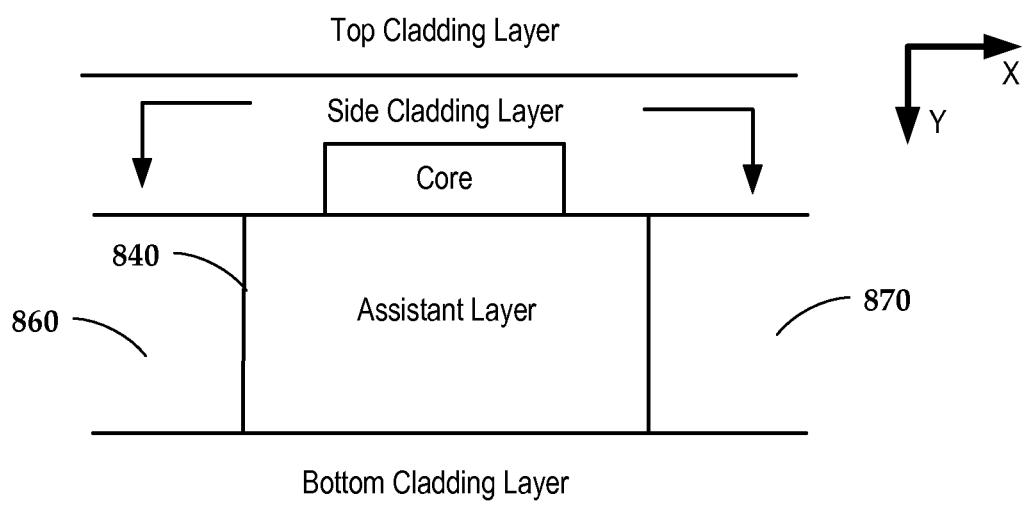
FIG. 8 is a cross-sectional view of a channeled assistant layer in accordance with embodiments described herein.

According to various implementations, the assistant layer 840 is channeled and is surrounded by cladding layers. As shown in FIG. 8, the assistant layer 840 is also surrounded by cladding layers 860, 870. The cladding layers 860 and 870 may comprise the same material as the intermediate bottom cladding layer, for example.

Figure 9A:
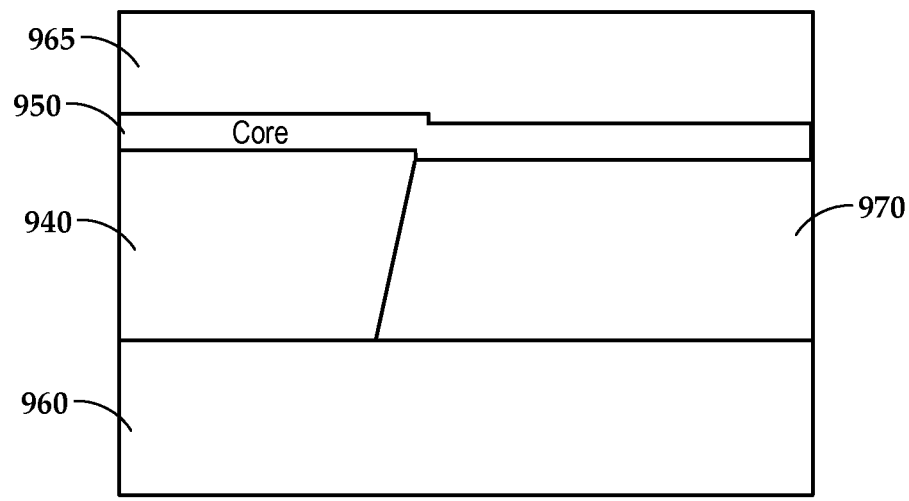
FIG. 9A is a cross-sectional view of an out-of-plane step and an in-plane taper as shown according some aspects.

According to various configurations described herein, an apparatus includes both an out-of-plane step and an in-plane taper as shown in FIG. 9A. The waveguide core includes an out-of-plane step 940. The assistant layer 940 is tapered and is truncated by an intermediate bottom cladding layer 970. The core 950 and the assistant layer 940 are surrounded by other cladding layers 960, 965.

Figure 9B:
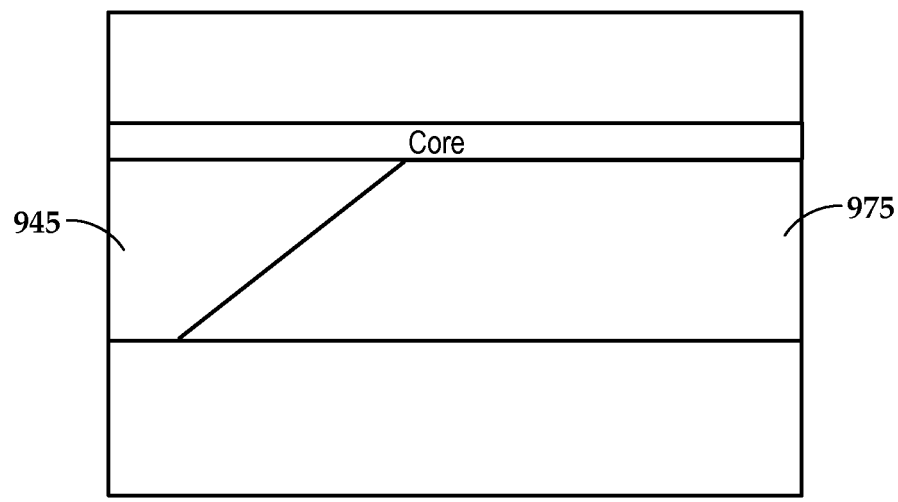
FIG. 9B is a cross-sectional view of a shallow trench wall slope and intermediate bottom cladding layer in accordance with various embodiments.

FIG. 9B illustrates a shallow trench wall slope that can be used to reduce the mode mismatch between the assistant layer 945 and the intermediate bottom cladding layer 975. According to various embodiments, an apparatus includes an out-of-plane slope near the interface of the assistant layer and the intermediate bottom cladding layer as shown in FIG. 9B.

According to various embodiments, a method involves receiving light from a light source by an assistant layer that comprises an out-of-plane step. In some cases, the assistant layer comprises an out-of-plane slope from the assistant layer to the intermediate bottom cladding layer. Light is received from the assistant layer by a core layer, the core layer comprising a taper that widens toward the media-facing surface. Light is received from the core layer by a near field transducer that is disposed proximate a media facing surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a waveguide extending along a light-propagation direction between a light source and a media-facing surface, the waveguide comprising:
   an assistant layer extending along the light propagation direction and configured to receive light from a light source, the assistant layer truncated, along the light propagation direction, with an intermediate bottom cladding layer;
   a core layer comprising a coupling end configured to receive light from the assistant layer, the coupling end comprising a taper that widens toward the media-facing surface; and
   a near field transducer disposed proximate the media-facing surface and configured to receive the light from the core layer.

2. The apparatus of claim 1, wherein the assistant layer comprises an in-plane taper.

3. The apparatus of claim 2, wherein the in-plane taper is a linear taper.

4. The apparatus of claim 2, wherein the in-plane taper is a non-linear taper.

5. The apparatus of claim 2, wherein the assistant layer comprises a termination end with a taper that narrows towards the media facing surface.

6. The apparatus of claim 1, wherein the assistant layer further comprises an out of plane step.

7. The apparatus of claim 6, wherein the out-of-plane step is located near an interface between the assistant and the intermediate bottom cladding layer.

8. The apparatus of claim 6, wherein a width of the out-of-plane step is between about 20 nm and 100 nm.

9. The apparatus of claim 1, wherein the assistant layer further comprises an out-of-plane slope from the assistant layer to the intermediate bottom cladding layer.

10. The apparatus of claim 1, wherein the waveguide further comprises top and bottom cladding layers configured to confine the light within the core layer and the assistant layer.

11. An apparatus, comprising:
    a waveguide extending along a light-propagation direction between a light source and a media-facing surface, the waveguide comprising:
    an assistant layer extending along the light propagation direction and configured to receive light from a light source, the assistant layer comprising an out-of-plane step and a terminating end with a first taper that narrows toward the media-facing surface, the assistant layer truncated, along the light propagation direction, with an intermediate bottom cladding layer;
    a core layer comprising a coupling end configured to receive light from the assistant layer, the coupling end comprising a second taper having a first width proximate the light source and a second width away from the light source, the second width being greater than the first width; and
    a near field transducer disposed proximate the media-facing surface and configured to receive the light from the core layer.

12. The apparatus of claim 11, wherein the assistant layer further comprises an in-plane taper.

13. The apparatus of claim 12, wherein the in-plane taper is a linear taper.

14. The apparatus of claim 12, wherein the in-plane taper is a non-linear taper.

15. The apparatus of claim 12, wherein the assistant layer comprises a termination end with a taper that narrows towards the media facing surface.

16. The apparatus of claim 1, wherein the assistant layer is truncated with an intermediate bottom cladding layer.

17. The apparatus of claim 16 wherein the out-of-plane step is located near an interface between the assistant and the intermediate bottom cladding layer.

18. The apparatus of claim 11, wherein a width of the step is between about 20 nm and 100 nm.

19. The apparatus of claim 11, wherein the assistant layer further comprises an out-of-plane slope from the assistant layer to the intermediate bottom cladding layer.

20. The apparatus of claim 11, wherein the waveguide further comprises top and bottom cladding layers configured to confine the light within the core layer and the assistant layer.

* * * * *